United States Patent [19]

Noristi et al.

[11] Patent Number: 5,557,025
[45] Date of Patent: Sep. 17, 1996

[54] HYPERPURE PROPYLENE POLYMER

[75] Inventors: Luciano Noristi; Giovanni Baruzzi, both of Ferrara, Italy

[73] Assignee: Montell North America Inc., Wilmington, Del.

[21] Appl. No.: 675,229

[22] Filed: Mar. 26, 1991

[30]   Foreign Application Priority Data

Mar. 30, 1990 [IT] Italy ....................... 19892/90

[51] Int. Cl.$^6$ ................... C07C 2/08; C07C 2/22
[52] U.S. Cl. ................. 585/522; 585/520; 585/521; 585/523; 585/524
[58] Field of Search ............... 585/10, 520, 525, 585/521, 522, 523

[56]           References Cited

U.S. PATENT DOCUMENTS

| | | | |
|---|---|---|---|
| 2,528,876 | 11/1950 | Evering et al. | 260/683.15 |
| 2,592,428 | 4/1952 | Kemp et al. | 260/683.15 |
| 2,772,317 | 11/1956 | Smith et al. | 260/683.15 |
| 2,810,774 | 10/1957 | Sersiuk | 260/683.15 |
| 3,631,002 | 12/1971 | Brownstein | 260/80.78 |
| 4,548,915 | 10/1985 | Goodall et al. | 502/104 |
| 4,971,937 | 12/1990 | Albizzati et al. | 502/126 |

FOREIGN PATENT DOCUMENTS

| | | |
|---|---|---|
| 0340688 | 11/1989 | European Pat. Off. . |
| 1044401 | 9/1966 | United Kingdom . |

*Primary Examiner*—Ponnathapura Achutamurthy

[57]            ABSTRACT

A process for preparing hyperpure propylene (co)polymers comprising polymerizing the monomer(s) in liquid monomer in the presence of a catalyst obtained by reacting an Al-trialkyl compound with a solid catalyst component comprising magnesium dihalide in active form, having supported thereon a titanium chloride or chloroalcoholate, and an ether having the general formula:

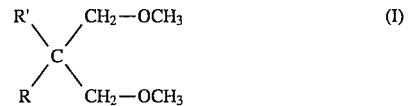

where R and R" are the same or different and are $C_{2-18}$ alkyl, $C_{3-18}$ cycloalkyl, $C_{6-18}$ aryl, $C_{7-18}$ arylalkyl or alkylaryl radicals.

4 Claims, No Drawings

HYPERPURE PROPYLENE POLYMER

The present invention concerns a process for the preparation of hyperpure propylene (co)polymers and the (co)polymers thus obtained.

It is known that the metal content of propylene (co)polymers used in form of films as dielectric capacitors must be as low as possible. In particular, the "capacitor grade" propylene polymers must have a relatively low ash content (less than 50 ppm) and a chlorine content of less than 10 ppm.

In order to reduce the catalyst residue and ash content to such low values, up to now the polymers had to be subjected to costly purification treatments after polymerization.

European patent application EP 0 340 688 A2 describes a process used to obtain capacitor grade propylene polymers which do not require post polymerization treatments. Said process is based on the use, under gas phase polymerization conditions comprising very long residence times (6 hours or more) and very high pressures, of catalysts obtained by reacting an Al-trialkyl compound and a silicon compound containing a least one Si—OR bond (R=hydrocarbon radical) with a solid component prepared by supporting a titanium halide and phthalic acid ester on a magnesium halide in active form. The polymers have an ash content of 17 to 42 ppm, a Ti content of 0.25 to 0.6 ppm, a chlorine content of 5 to 15 ppm and an Al content of 4.2 to 10 ppm.

It has now been found that hyperpure propylene (co)polymers can be advantageously obtained by means of a process comprising polymerizing the monomer(s) in liquid monomer in the presence of a catalyst obtained by reacting an Al-trialkyl compound with a solid catalyst component comprising magnesium dihalide in active form, having supported thereon a titanium chloride or chloroalcoholate, and an ether having the general formula:

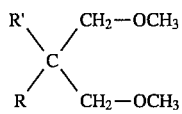

(I)

where R and R' are the same or different and are $C_{2-18}$ alkyl, $C_{3-18}$ cycloalkyl, $C_{6-18}$ aryl, $C_{7-18}$ arylalkyl or alkylaryl radicals.

The propylene (co)polymers obtained by the process of the invention are characterized by an ash content of less than 15 ppm, chlorine content of less than 5 ppm, Al content of less than 5 ppm, and Mg and Ti contents below the detectable limits of the X-ray fluorescence and atomic absorption spectroscopy methods used (2 ppm and 1 ppm determined respectively with X-ray fluorescence in the case of Mg and atomic absorption spectroscopy in the case of Ti).

The polymers of the invention comprise polypropylene with an isotactic index higher than 90 and crystalline copolymers of propylene with $CH_2=CHR$ olefins, where R is hydrogen or an alkyl radical with 2–8 carbon atoms.

According to the process of the invention the residence times of the catalyst in the polymerization zone can be as low as 2 hours, generally they are from 4 to 8 hours.

In the ether of formula (I) preferably R and $R^1$ are isobutyl, or R is isopropyl and $R^1$ is isoamyl or cyclohexyl.

The ethers of formula (I) can be prepared by the methods described in U.S. application Ser. No. 07/413,409.

The preferred titanium compound is $TiCl_4$ and the Al-alkyl compound is preferably Al-triisobutyl.

The solid catalyst component is obtained by reacting excess $TiCl_4$ at 100°–120° C. with a $MgCl_2 \cdot nROH$ adduct, where n is a number from 1 to 3 and R is ethyl, butyl or isobutyl.

After reaction the excess $TiCl_4$ is separated hot by filtration and the solid is treated at 100°–120° C. at least one more time with excess $TiCl_4$. The excess $TiCl_4$ is removed hot by filtration and the solid is washed with hexane or heptane until no chloride ions are in the wash.

Due to the use of the ethers of formula (I) in the preparation of the catalyst component, it is possible in the polymerization to use a molar ratio between Al and Ti of less than 50, in order to permit the obtainment of polymers having low Al content.

Moreover, it has been found, and this constitutes a particular embodiment of the present invention, that the Al content can be lowered even more if, after polymerization, the polymer is submitted to a countercurrent wash with liquid propylene. The Al content in the polymer is reduced very effectively if the catalyst used is obtained from Al-triisobutyl. In this case the Al content is brought down to values lower than 3 ppm.

Polymerization of propylene or mixtures thereof with other alpha-olefins is carried out at temperatures from 70° to 90° C. Given the high activity of the catalyst, residence times of 4–8 hours are usually sufficient.

As already indicated, the propylene polymers of the invention are useful in the manufacture of capacitors and electrical circuits.

The following examples are given to illustrate and not limit the invention. The parts per million (ppm) refer to the weight of the polymer.

The total ash content is determined according to ASTM D-229.86 using 200 g, not 5 g, of polymer; the Mg, Al and Cl content is determined with X-ray fluorescence and the Ti content with atomic absorption spectroscopy.

The melt index (MIL) is determined according to ASTM D-1238, condition L.

EXAMPLE 1

Into a 1 liter flask equipped with condenser, mechanical agitator and thermometer, are introduced under nitrogen atmosphere 625 cc of $TiCl_4$, and then 25 g of a $MgCl_2 \cdot 2.1 C_2H_5OH$ adduct prepared according to the procedure and ingredients described in Example 1 of U.S. Pat. No. 4,469,648. The adduct is introduced at 0° C. The mixture is brought to 100° C. in 1 hour. When the temperature reaches 40° C., 21.7 mmoles of 2-isopropyl-2-isoamyl-1,3-dimethoxypropane are introduced and the content is maintained at 100° C. for 2 hours, after which it is allowed to settle and the supernatant liquid is syphoned off.

550 ml of $TiCl_4$ are added and the mixture is then heated to 120° C. for 1 hour with agitation. The agitation is then stopped, the mixture is allowed to settle and the supernatant liquid removed by syphoning. The solid is then washed 6 times with aliquots of 200 ml of hexane at 60° C. and then 3 times at ambient temperature, after which it is dried under vacuum.

The solid thus obtained contains 4.1% by weight of Ti and 13.6% by weight of 2-isopropyl-2-isoamyl-1,3-dimethoxypropane.

The ether used in this example is prepared according to the method described in Example 1 of U.S. application Ser. No. 07/413,409.

Into a 950 l loop reactor thermoregulated at 70° C. are fed continuously propylene and hydrogen in quantities sufficient to obtain a MIL of 2 to 2.5, a catalyst component as an oily paste (250 g/l) and Al-triisobutyl as 10% by weight heptane solution. The Al/Ti atomic ratio is 30, and it is maintained constant.

The propylene flow rate is 88.5 Kg/h, while the flow rate of the catalyst component is regulated in such a way that there is constant concentration of polymer in the reactor (0.29 Kg/l of slurry).

The average residence time is 6 hours.

Other operating conditions are shown in Table 1.

EXAMPLE 2

The catalyst used in this example is prepared according to the method and ingredients of Example 1, except that the ether used is 2-cyclohexyl-2-isopropyl-1,3-dimethoxypropane.

The solid catalyst component contains 3.44% by weight Ti and 11.5% by weight ether.

The ether used in this example is prepared according to the method described in Example 5 of U.S. patent application Ser. No. 07/413,409.

Propylene polymerization is carried out under the same conditions of Example 1. The results obtained are shown in Table 1.

COMPARATIVE EXAMPLE 1

The catalyst used in this example is prepared under the same conditions of Example 1, except that instead of the ether, 16.3 mmoles of diisobutylphthalate are used.

Propylene polymerization in this case is done using cyclohexyl(methyl)dimethoxysilane added to Al-triisobutyl in a molar ratio of Al/Ti=10. Other operating conditions and results are shown in Table 1.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

We claim:

1. A process for preparing hyperpure propylene polymers or copolymers with $CH_2=CHR$ olefins, where R is hydrogen or an alkyl radical with 2–8 carbon atoms, said polymers containing less than 15 ppm by weight of total ash, less than 5 ppm Al and less than 5 ppm Cl said process comprising polymerizing the monomers in liquid monomer in the presence of a catalyst obtained by reacting an Al-trialkyl compound with a solid catalyst component consisting essentially of magnesium dihalide in active form, having supported thereon a titanium chloride or chloroalcoholate, and an ether having the general formula:

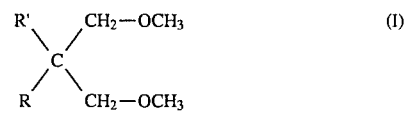

where R and R' are the same or different and are $C_{2-18}$ alkyl, $C_{3-18}$ cycloalkyl $C_{6-18}$ aryl, $C_{7-18}$ arylalkyl or alkylaryl radicals.

2. The process of claim 1, wherein the Al-trialkyl compound is Al-triisobutyl.

3. The process of claim 1, wherein the residence time of the catalyst in the polymerization zone is from 4 to 8 hours.

TABLE 1

| | POLYMERIZATION CONDITIONS & RESULTS | | | | | | | | | | | | |
|---|---|---|---|---|---|---|---|---|---|---|---|---|---|
| Ex. No. | Al/Ti (a.r.) | Al/Si (a.r.) | Propylene Feed (Kg/h) | $H_2$ (mol. %) | Average Residence Time (h) | Polymer Productivity (Kg/h) | Yield (Kg/g cat.) | MIL (dg/min.) | Total Ash (ppm/Weight) | Catalytic Residues (ppm/Weight) | | | |
| | | | | | | | | | | Ti | Mg | Cl | Al |
| 1 | 30 | — | 88.5 | 0.038 | 6 | 46 | 150 | 2.4 | 15 | <1 | <2 | 4.2 | 4.8 |
| 2 | 30 | — | 88.5 | 0.04 | 6 | 46 | 147 | 2.3 | 14 | <1 | <2 | 4.2 | 4.5 |
| 1 Comp. | 60 | 10 | 88.5 | 0.04 | 6 | 46 | 80 | 2.1 | 30 | <1 | 2.5 | 8.2 | 11 |

4. The process of claim 2 further comprising a countercurrent wash of the (co)polymer with liquid propylene, thus obtaining a (co)polymer containing less than 3 ppm Al.

* * * * *

UNITED STATES PATENT AND TRADEMARK OFFICE
CERTIFICATE OF CORRECTION

PATENT NO. : 5,557,025

DATED : September 17, 1996

INVENTOR(S) : Luciano Noristi et al.

It is certified that error appears in the above-indentified patent and that said Letters Patent is hereby corrected as shown below:

Title page, item [57],
In Abstract, line 11, change " R" " to --R'--.

Signed and Sealed this

Twenty-first Day of January, 1997

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,557,025
DATED : September 17, 1996
INVENTOR(S) : Luciano Noristi et al It is certified that error appears in the above-identified patent and that said Letters Patent is hereby corrected as shown below:

In Abstract, line 11, change " R" " to --R'--.
At col. 4, line 10, delete --in liquid monomer--.

This certificate supersedes Certificate of Correction issued January 21, 1997.

Signed and Sealed this

Fifteenth Day of April, 1997

Attest:

BRUCE LEHMAN

Attesting Officer     Commissioner of Patents and Trademarks